US011919340B2

(12) United States Patent
Miles et al.

(10) Patent No.: US 11,919,340 B2
(45) Date of Patent: Mar. 5, 2024

(54) RESILIENT COMPOSITE STRUCTURAL SUPPORT

(71) Applicants: Compagnie Generale des Etablissements Michelin, Clermont-Ferrand (FR); Kevin Corbett Miles, Clemson, SC (US); Steven M Cron, Simpsonville, SC (US); Ryan Michael Gaylo, Simpsonville, SC (US)

(72) Inventors: Kevin Corbett Miles, Clemson, SC (US); Steven M Cron, Simpsonville, SC (US); Ryan Michael Gaylo, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 411 days.

(21) Appl. No.: 17/265,972

(22) PCT Filed: Aug. 6, 2019

(86) PCT No.: PCT/US2019/045254
§ 371 (c)(1),
(2) Date: Feb. 4, 2021

(87) PCT Pub. No.: WO2020/033374
PCT Pub. Date: Feb. 13, 2020

(65) Prior Publication Data
US 2021/0291591 A1    Sep. 23, 2021

Related U.S. Application Data

(60) Provisional application No. 62/715,270, filed on Aug. 6, 2018.

(51) Int. Cl.
*B60C 7/18*   (2006.01)
*B60C 7/24*   (2006.01)
(Continued)

(52) U.S. Cl.
CPC ............... *B60C 7/18* (2013.01); *B60C 7/24* (2013.01); *B60C 7/146* (2021.08); *F16F 1/3686* (2013.01)

(58) Field of Classification Search
CPC ........... B60C 7/18; B60C 7/146; B60C 7/143; B60C 7/24; B60B 9/26
See application file for complete search history.

(56) References Cited

U.S. PATENT DOCUMENTS 820,077 A    5/1906   Whiteley
3,687,440 A  8/1972   Jarret et al.
(Continued)

FOREIGN PATENT DOCUMENTS

CN   103895452 A   7/2014
FR      441363 A   8/1912
(Continued)

OTHER PUBLICATIONS

European Patent Office, International search report and written opinion for PCT/US2019/045254 dated Sep. 10, 2019, pp. 1-13 (included), European Patent Office, Rijswijk, The Netherlands.

*Primary Examiner* — Kip T Kotter
(74) *Attorney, Agent, or Firm* — John S. Schwab

(57) ABSTRACT

An improved resilient composite structure for connecting two surfaces together where the structure includes an elastomeric joint body connected to one of the two surfaces and at least one reinforcement membrane at one end of the resilient composite structure, where the reinforcement membrane wraps around the end of the resilient composite structure such that one end of the reinforcement membrane is positioned along a side of the resilient composite structure and the other end of the reinforcement membrane is positioned on the opposite side of the resilient composite structure.

20 Claims, 12 Drawing Sheets

(51) Int. Cl.
*B60C 7/14* (2006.01)
*F16F 1/368* (2006.01)

(56) References Cited

U.S. PATENT DOCUMENTS

| | | |
|---|---|---|
| 5,358,210 A | 10/1994 | Simon et al. |
| 5,538,057 A | 7/1996 | homma |
| 2010/0200131 A1* | 8/2010 | Iwase .................... B60C 17/061 152/209.1 |

FOREIGN PATENT DOCUMENTS

| | | | | |
|---|---|---|---|---|
| FR | 1164324 | A | 10/1958 | |
| JP | 2001301429 | A | 10/2001 | |
| JP | 2001354014 | A | 12/2001 | |
| JP | 2011025758 | A | 2/2011 | |
| KR | 20130056788 | A * | 5/2013 | |
| WO | 2018067597 | A1 | 4/2018 | |
| WO | WO-2018067597 | A1 * | 4/2018 | ............ B60C 7/146 |
| WO | 2018126157 | A1 | 7/2018 | |

\* cited by examiner

RESILIENT COMPOSITE STRUCTURAL SUPPORT

FIELD OF THE INVENTION

The subject matter of the present invention relates to a support structure for a tire.

SUMMARY OF THE INVENTION

Aspects and advantages of the invention will be set forth in part in the following description, or may be obvious from the description, or may be learned through practice of the invention.

At least one embodiment discloses a composite spring comprised of an elastomer and a second material having a relatively higher bending stiffness than the elastomer, the composite spring having a first hinge side and a second hinge side comprised of the second material, and a joint body comprised of the elastomer, wherein the second material comprising the first hinge side and second hinge side are discontinuous or otherwise separated from one another by the joint body connecting the first hinge side and the second hinge side.

At least one embodiment according to the preceding paragraph wherein the elastomer is an elastomeric rubber.

At least one embodiment according to any of the two preceding paragraphs wherein the second material is a stiff composite such as a glass fiber reinforced resin.

At least one embodiment according to any of the three preceding paragraphs wherein the composite spring forms a support element for a tire.

At least one embodiment according to the preceding paragraph wherein the support structure is a spoke in a non-pneumatic tire.

At least one embodiment discloses a spoke for a tire, the tire being attached to a hub including an outer tread band, a first spoke element, a second spoke element and a joint body connecting said first spoke element and said second spoke element, wherein the joint body comprises an elastic material arranged such that the first spoke element and the second spoke element is deflectable in at least a first plane of bending, where in the first spoke element and second spoke element are disposed between the hub and the outer tread band.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
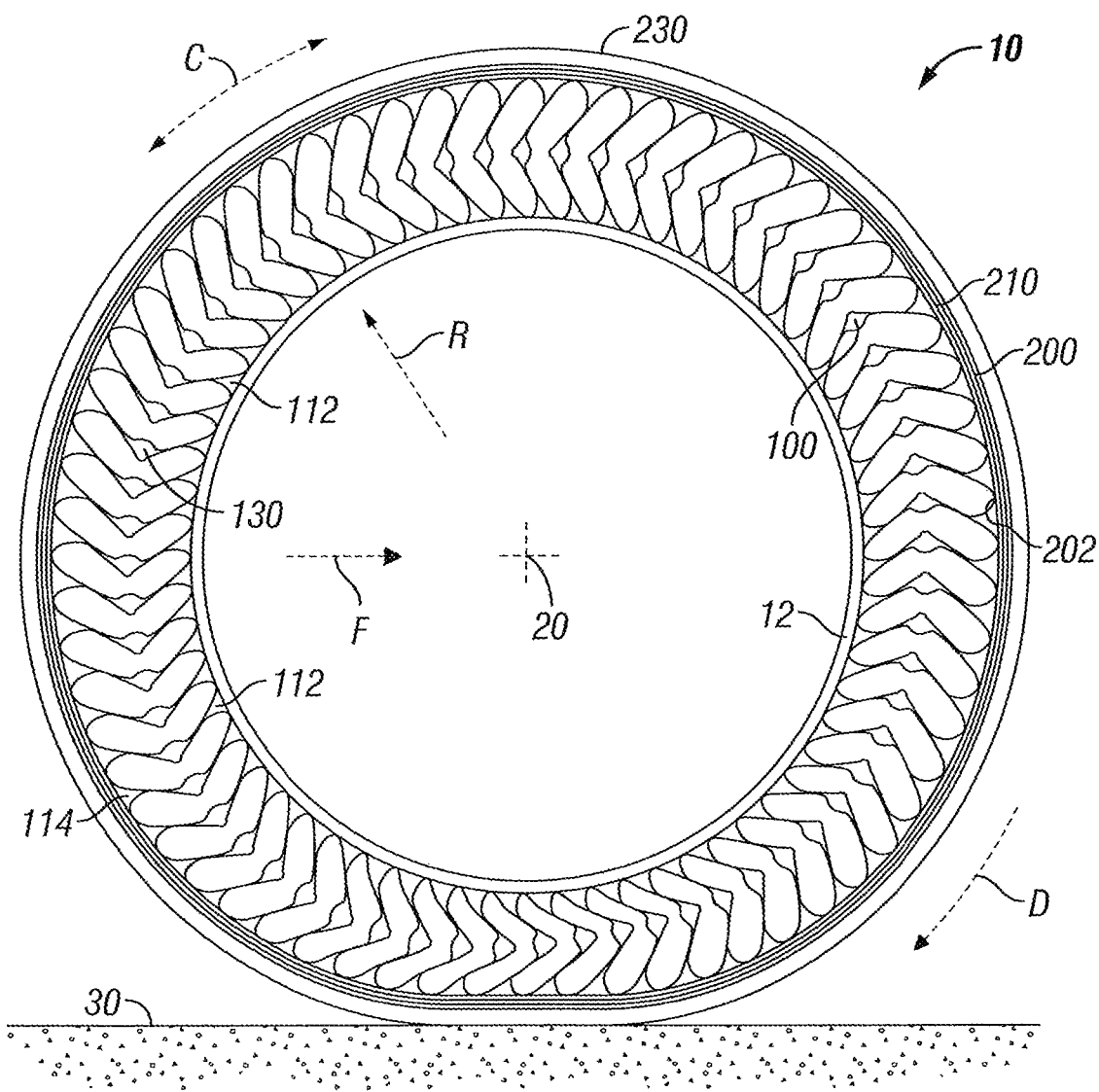
FIG. 1 provides a lateral side view of an exemplary embodiment of the present invention wherein a plurality of resilient composite structures are configured as spokes forming a part of a tire under nominal loading conditions.

The present invention provides a mechanical structure for resiliently supporting a load. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The following terms are defined as follows for this disclosure:

"Axial direction" or the letter "A" in the figures refers to a direction parallel to the axis of rotation of for example, the shear band, tire, and/or wheel as it travels along a road surface.

"Radial direction" or the letter "R" in the figures refers to a direction that is orthogonal to the axial direction and extends in the same direction as any radius that extends orthogonally from the axial direction.

"Equatorial plane" means a plane that passes perpendicular to the axis of rotation and bisects the outer tread band and/or wheel structure.

"Circumferential direction" or the letter "C" in the figures refers to a direction is orthogonal to the axial direction and orthogonal to a radial direction.

"Forward direction of travel" or the letter "F" in the figures refers to the direction the tire was designed to predominantly travel in for aesthetics and or performance reasons. Travel in a direction different than the forward direction of travel is possible and anticipated.

"Direction of rotation" or the letter "D" in the figures refers to the direction the tire was designed to predominantly rotate in for aesthetics and/or performance reasons. Rotation in a direction opposite than the direction of rotation is possible and anticipated.

"Radial plane" means a plane that passes perpendicular to the equatorial plane and through the axis of rotation of the wheel.

"Lateral direction" or the letter "L" means a direction that is orthogonal to an equatorial plane.

"Elastic material" or "Elastomer" as used herein refers to a polymer exhibiting rubber-like elasticity, such as a material comprising rubber.

"Elastomeric" as used herein refers to a material comprising an elastic material or elastomer, such as a material comprising rubber.

"Interior angle" or "Internal angle" as used herein means an angle formed between two surfaces that is greater than 0 degrees but less than 180 degrees. An acute angle, a right angle and an obtuse angle would all be considered "interior angles" as the term is used herein.

"Exterior angle" or "External angle" or "Reflex angle" as used herein means an angle formed between two surfaces that is greater than 180 degrees but less than 360 degrees.

"Deflectable" means able to be bent resiliently.

"Nominal load" or "desired design load" is a load for which the structure is designed to carry. More specifically, when used in the context of a wheel or tire, "nominal load" refers to the load for which the wheel or tire is designed to carry and operate under. The nominal load or desired design load includes loads up to and including the maximum load specified by the manufacturer and, in the case of a vehicle tire, often indicated by marking on the side of a the tire. A loading condition in excess of the nominal load may be sustained by the structure, but with the possibility of structural damage, accelerated wear, or reduced performance A loading condition of less than nominal load, but more than an unloaded state, may be considered a nominal load, though deflections will likely be less than deflections at nominal load.

"Modulus" or "Modulus of elongation" (MPa) was measured at 10% (MA10) at a temperature of 23° C. based on ASTM Standard D412 on dumb bell test pieces. The measurements were taken in the second elongation; i.e., after an accommodation cycle. These measurements are secant moduli in MPa, based on the original cross section of the test piece.

FIG. 1 shows a lateral side view of an exemplary embodiment of the present invention wherein a plurality of resilient composite structures are configured as spokes 100 and are attached to an outer tread band 200 forming a part of a tire 10. The tire 10 may be incorporated into a wheel. For example the tire 10 may be part of non-pneumatic wheel having a hub 12 which is attached to a passenger vehicle allowing the vehicle to roll across a ground surface. Other objects and vehicles may incorporate the invention, including but not limited to: heavy duty truck, trailer, light truck, off-road, ATV, bus, aircraft, agricultural, mining, bicycle, motorcycle and passenger vehicle tires. Such a non-pneumatic wheel would possess a hub 12 that would have a radially outer surface having an axis of revolution about a central axis 20. The tire 10 may be attached to the hub 10 by any of a number of methods, for example, by mechanical fasteners such as bolts, screws, clamps or slots, and/or by adhesives such as cyanoacrylates, polyurethane adhesives, and/or by other bonding materials or a combination thereof.

The tire 10 shown here possesses an axis of rotation 20 about which the tire 10 rotates. In this exemplary embodiment, the radially outer surface 230 of the outer tread band 200 interfaces with a ground surface 30 over which the tire rolls. Under a nominal load, the spokes 100 of the tire flex as the tire enter and exit the contact patch. Smaller deflections occur in the spokes 100 as the spoke rotates about the axis 20 outside the contact patch, but most of the deflection occurs while the spoke 100 enters, exits and travels through the contact patch.

Each spoke of this exemplary embodiment 100 possesses a "nose" portion 130 which acts as a resilient hinge. The "nose" portion 130 is an elastomeric joint body connecting a support element forming the radially inner portion of the spoke and a support element forming the radially outer portion of the spoke. The support elements of the spoke 100 are initially positioned at an angle relative to each other. The angle between the spoke support elements measuring less than 180 degrees is the interior angle and the angle between the spoke support elements measuring greater than 180 degrees is the exterior angle. The elastomeric joint is comprised of an elastomer attached to each spoke support element and is positioned on the side of the spoke elements on the interior angle side.

The radially inner portion of the spoke possesses a radially inner foot 112 which connects to another surface, which is the radially outer surface of the hub 12 in the present embodiment. In the present embodiment, the radially inner foot 112 is comprised of an elastomeric joint body that connects the radially outer support to the hub 12. The radially outer portion of the spoke 100 possesses a radially outer foot 114 which is comprised of another elastomeric body which connects the outer support element to yet another surface which is in the present embodiment the radially inner surface of the outer tread band 200.

In the exemplary embodiment shown, the tread band 200 comprises an elastomeric material and allows deformation to form a planar footprint in the contact patch. In the exemplary embodiment shown, the radially outer foot 114 of the spoke 100 is attached to the radially inner surface 202 of the tread band 200 and to the opposite side of the support element from the nose portion 130. In the exemplary embodiment shown, the spoke is adhered in place by a cyanoacrylate adhesive. In other embodiments, the spoke may be attached by other adhesives, such as a urethane adhesive, or may be attached by other methods, including by adhering the elastomeric material together, for instance by using green rubber and curing the rubber components together, or using a strip of green rubber between cured or partially cured rubber components. In some embodiments, the outer tread band 200 may also possess a reinforcement to help carry the load circumferentially around the tire.

For this particular embodiment, the size of the tire 100 is 205/55R16 with the lateral width of the tread being about 165 mm.

Figure 2:
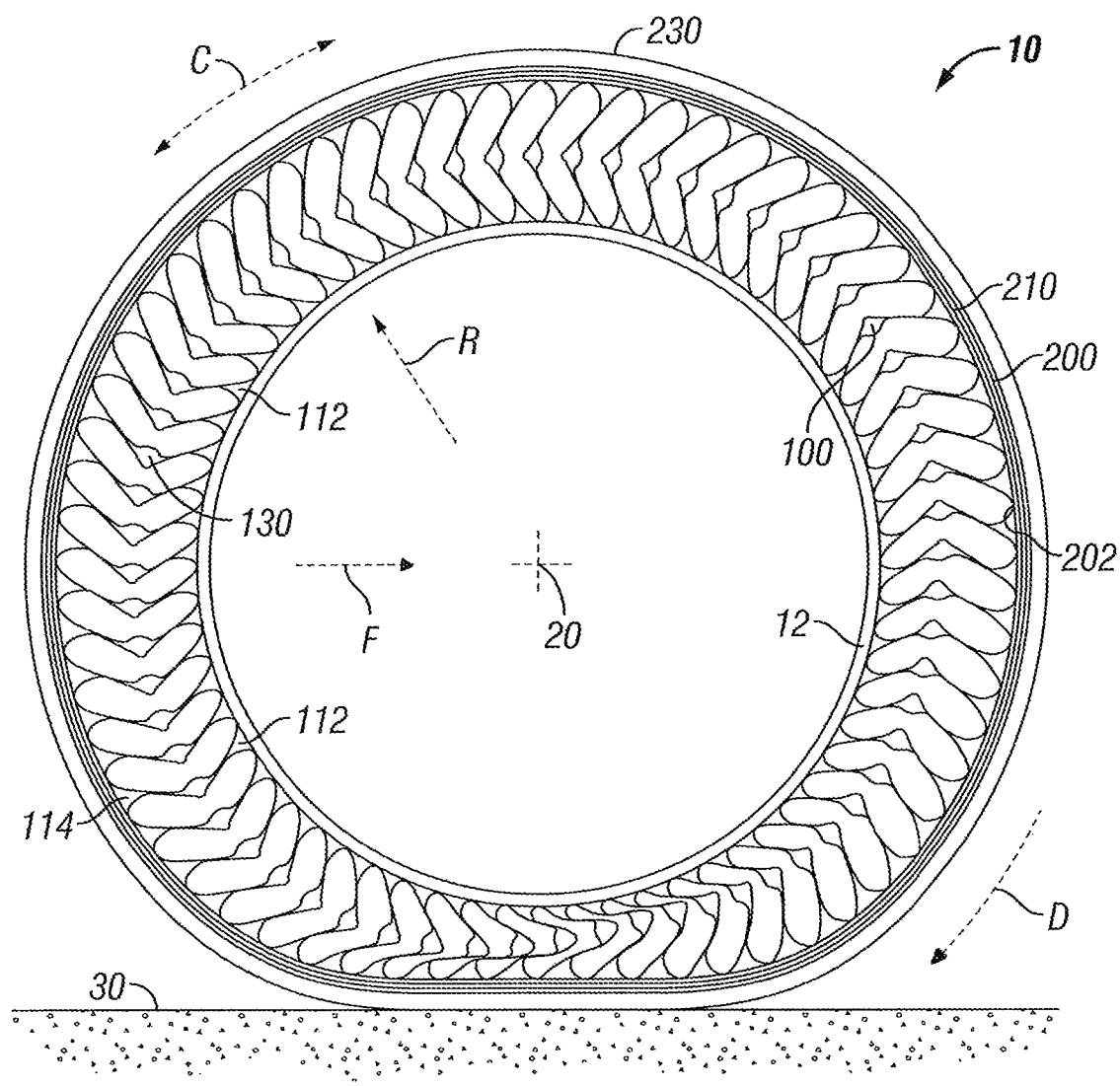
FIG. 2 provides a lateral side view of an exemplary embodiment of the present invention wherein a plurality of resilient composite structures are configured as spokes forming a part of a tire under greater than nominal loading conditions.

FIG. 2 shows the exemplary embodiment of the invention, configured as a spoke in a wheel 10, where the embodiment is loaded in excess of its nominal load. In this particular instance, the tire was loaded with 1000 kg of mass load (approximately 9800 N force). In this case the deflection exceeded 20 mm and resulted in contact between the spoke nose portion 130 and spoke foot portions 110. Under such conditions, the nose and foot portions act as a "bump stop" unloading the leg portions of the spoke. The individual spokes 100 in this situation may make contact with one another as they enter, exit and or travel through the contact patch. The contact is illustrated as occurring between the nose portion 130 and the radially outer foot 114 where the spokes are entering the contact patch and contact is illustrated as occurring between the nose portion 130 and the radially inner foot portion 112 where the spokes are exiting the contact patch. While contact of an individual spoke with the spoke adjacent to it may occur, a portion of the load may be transferred in this case, through the radially inner foot 112, through the nose portion of the spoke 130, through the radially outer foot 114 and through the outer tread band 200 to the ground 30. In a sense, the shape of the spokes of the present embodiment shown may act as a "bump stop" to prevent structural damage to the support elements or legs of the spoke connecting the feet 112, 114 with the nose 130 of the spoke. Such conditions of loading in excess of the nominal load could occur with overloading the vehicle with excess mass, or could occur if the tire encounters an obstacle, such as a curb, while traveling at high speed. While this particular embodiment behaves in this particular manner, other embodiments of the invention may behave differently, and may or may not exhibit "bump stop" qualities.

In the embodiment shown, the outer band 200 possesses reinforcement 210 to strengthen the outer band. A tread 230 is provided on the radially outer surface of the outer band 200. In this particular embodiment, the reinforcement is in the form of a circumferentially oriented fiber reinforced composite material. In other embodiments, other material such as metal may be used as a reinforcement to strengthen the bond. In such metallic reinforced outer band structures, the metal may take the form of one or more cables wound around the axis of rotation 20 of the tire 10.

Figure 3:
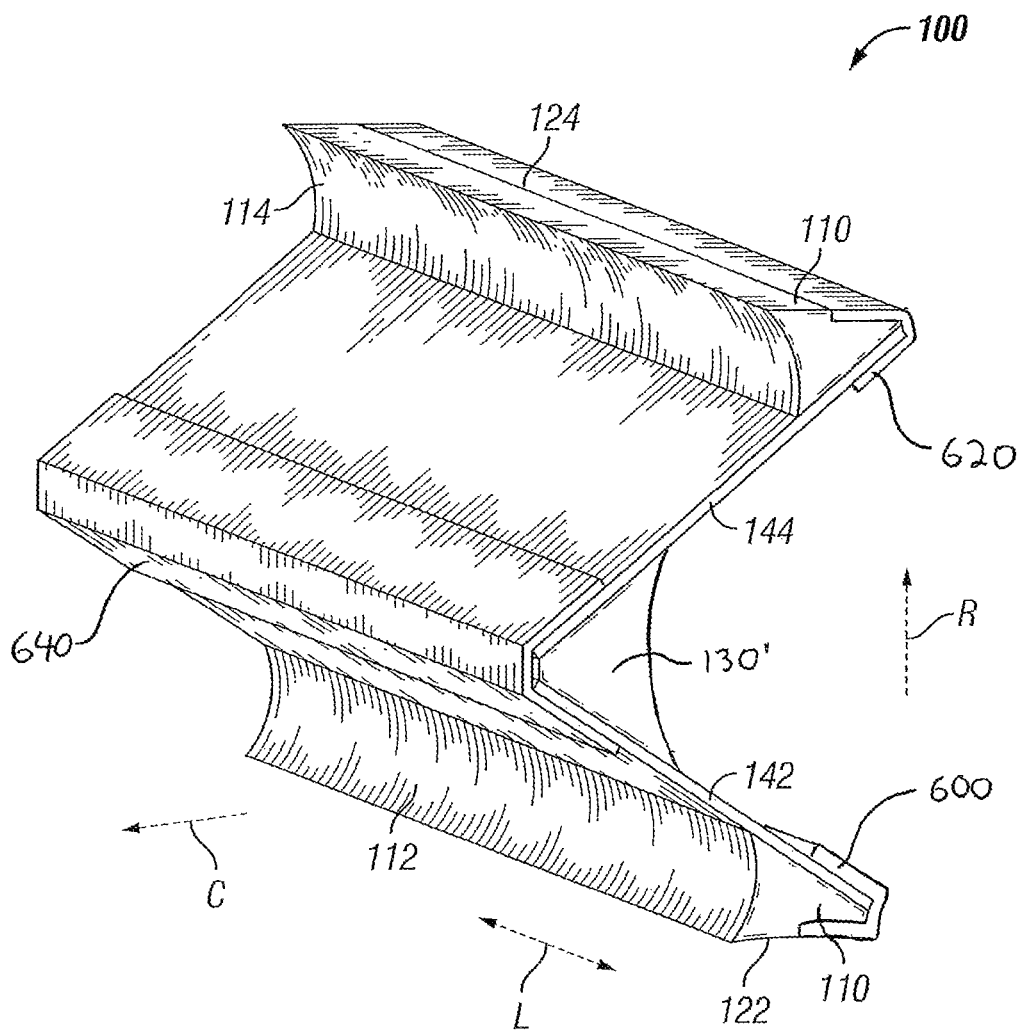
FIG. 3 provides a perspective view of an exemplary embodiment of the present invention configured as a spoke.

FIG. 3 provides a perspective view of an embodiment of a spoke 100. In this particular embodiment, the spoke maintains a similar cross section profile in the lateral (L) direction of the spoke. It can be seen that the feet 110, both the radially inner foot 112 and radially outer foot 114, each provide an attachment point to the hub 12 and outer band 200 of the wheel 10. A widening in the circumferential direction at the radially inner end of the radially inner foot 112 provides circumferentially broad surface 122 for attachment, such as adhering, bonding and/or mechanically, to the hub 12. A reinforcement membrane 600 is positioned at the circumferentially narrow portion of the radially inner foot 112. Likewise a widening in the circumferential direction at the radially outer end of the radially outer foot 114 provides circumferentially broad surface 124 for attachment, such as adhering, bonding and/or mechanically, to the outer tread band 200. A reinforcement membrane 620 is positioned at the circumferentially narrow portion of the radially outer foot 114. The radially inner surface 122 and radially outer surface 124 in the embodiment shown are shown to be slightly curved in the circumferential direction of the spoke to match the radius of curvature of the hub and radially inner surface 202 of the outer band 200 at the location where the spoke attaches in the respective positions. Alternatively, the surface of the radially inner surface 122 and radially outer surface 124 may also be flat in the circumferential direction of the spoke.

Alternative embodiments may have a reinforcement membrane 620 only at the radially outer portion of the spoke 100. In yet other alternative embodiments, the reinforcement membrane may be only at the radially inner portion of the spoke.

The nose portion, or otherwise referred to as the "joint body" 130' of the spoke 100 of the embodiment shown is comprised of an elastomeric material and acts to connect a first and second support element, here comprising a radially inner leg 142 and a radially outer leg 144 respectively. The nose portion becomes thicker in the circumferential direction between the radially inner leg 142 and radially outer leg 144. A reinforcement membrane 640 is positioned at the at the circumferentially narrow portion of the joint body 130' of the spoke. The reinforcement membrane 640 extends along at least a portion of the length of the radially outer leg 144 and extends along at least a portion of the length of the radially inner leg 142. The circumferential direction of the spoke should be understood in this embodiment to be the same as the circumferential direction of the wheel 10. In reference to a single spoke as shown in this embodiment, the circumferential direction is generally orthogonal to both the radial direction and the lateral direction.

It may be observed that the radially inner leg 142 is slightly shorter than the radially outer leg 142 in the embodiment shown. This difference in length accommodates the change in radius as the spoke travels through the contact patch maximizing the space available for the adjacent spokes to "nest."

Figure 4:
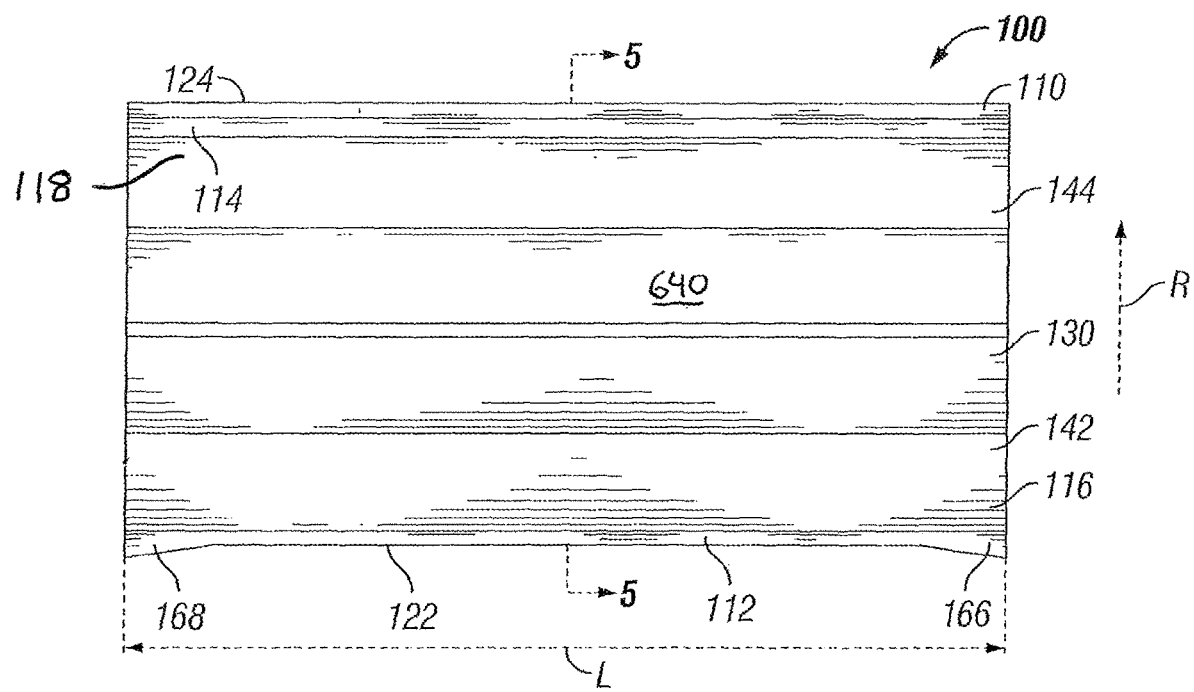
FIG. 4 provides a frontal view of the exemplary embodiment of the spoke.

FIG. 4 shows a front view of the spoke in a circumferential direction. The radially inner surface possesses a first and second protrusion 166, 168 which creates radially inner surface 122 that is curved in the lateral direction. This causes the cross section of the spoke 100 to vary slightly in the lateral direction. In alternative embodiments the spoke 100 may maintain an identical cross section in the lateral direction and otherwise lack the protrusions 166, 168 along the radially inner surface of the spoke 100.

Figure 5:
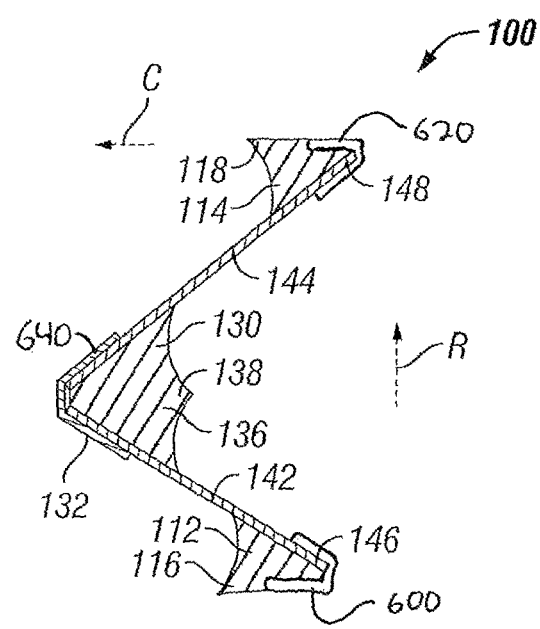
FIG. 5 provides a section view taken on line 5-5 of FIG. 4 showing an equatorial section view of the exemplary embodiment.

FIG. 5 shows a section view of the embodiment showing the main components of the spoke 100. The spoke 100 of the embodiment shown is comprised of rubber of the general type used in the construction of conventional rubber pneumatic radial tires, polyester cord material and fiberglass reinforced resin. Alternatively, other materials may be used, including aramid, cotton, nylon or rayon, or combinations of such cords, or cords comprising combinations of such materials.

The rubber used in the embodiment shown comprises of a relatively soft rubber having a modulus of 4.8 MPa in the areas of the radially inner elastomeric joint body 112 and radially outer elastomeric joint body 114. Each elastomeric joint body 112, 114 is attached to the radially inner leg 142 and radially outer leg 144 respectively. The radially inner leg 142 and radially outer leg 144 are constructed to give them flexural rigidity, that is, to allow them to resiliently deform when the spoke 100 is under compression or tension. The radially outer end 148 of the radially outer leg 144 is attached to the elastomeric joint body 114, but is otherwise "free" and may move to compress or stretch the elastomeric joint body 114 when the spoke is being stretched or compressed. Likewise the radially inner end 146 of the radially inner leg 142 is attached to the elastomeric joint body 112, but is otherwise "free" and may move to compress or stretch the elastomeric joint body 112 when the spoke 100 is under compression or tension. The radially inner elastomeric joint body 112 becomes thicker in the circumferential direction nearer the hub 12 to which it is attached. In the embodiment shown, the elastomeric joint body 112 flairs outward forming a protrusion 116 nearest the hub 10. Likewise, the radially outer elastomeric joint body 114 becomes thicker in the circumferential direction nearer the outer band 200 to which it is attached. In the embodiment shown, the elastomeric joint body 114 flairs outward forming a protrusion 118 nearest the outer band 200.

In the embodiment shown, a membrane 132, 640 is used to reinforce the nose section 130 of the spoke 100. The membrane structure 132 of the embodiment shown is comprised of polyester fibers made from an 1100 by 2 cord with a pace of approximately 1 mm and a tensile modulus of approximately 3,750 MPa. Such reinforcement fibers are similar to that commonly used in the radial cords of a pneumatic tire. The rubber surrounding the reinforcements of the membrane has a modulus of approximately 5 MPa. For the embodiment shown, this rubber is of a type used in the construction of a conventional pneumatic radial tire. Alternatively, other membrane reinforcement materials may be used, including using chords of other materials, such as aramid, cotton, nylon or rayon, or combinations of such cords, or cords comprising combinations of such materials. Alternatively, the reinforcement pace, filament count, cord count and diameter may vary. In the embodiment shown, the reinforcement membrane 132 extends approximately one-fifth of the height of the spokes, generally co-extensive with the generally triangular shaped nose elastomeric joint body 136. In the embodiment shown, the elastomeric joint body 136 thickens and flairs outward in the circumferential direction near the middle section between the radially inner and radially outer spoke legs 142, 144, forming a protrusion 138 at approximately the midpoint of the elastomeric joint body 136.

The reinforcement cords of the reinforcement membranes 640, 132 of the exemplary embodiment are oriented generally at a +45 degrees and −45 degrees to the radial direction along the length of the membranes. In other words, if a line is drawn along the radial direction on the face of the membrane, the cords would be oriented at a +45 degree angle and a −45 degree angle to that line. In alternative embodiments, other angles are possible, and in other embodiments, the cords of the reinforcement membrane 640 may be oriented at 0 degrees. In alternative embodiments, cords may be angled only along a single angle, for example only at +45 degrees, or if angled at multiple angles, for example +30 degrees and −60 degrees.

The legs 142, 144 of the spoke 100 are comprised of fiber reinforced plastic reinforcements surrounded by a rubber to form a membrane. The leg membranes 142, 144 possess a flexural rigidity of approximately 140,000 N-mm². In this particular embodiment, the filaments have a diameter of approximately 1 mm with a pace of about 2 mm apart. The filaments of the particular embodiment shown are glass reinforced resin formed by pultrusion. The filaments of the embodiment have a modulus of approximately 10 MPa. Alternatively other reinforcements may be used, including carbon fiber such as graphite epoxy, glass epoxy or aramid reinforced resins or epoxy or combinations thereof. Unreinforced plastic reinforcements or metallic reinforcements may also be used, provided they have sufficient flexural rigidity for the nominal loads intended to be supported. Alternatively other pacing and other diameters diameter of the membranes and reinforcements may be used. The legs 142, 144 of the spoke 100 have a relatively large stiffness compared to the other components comprising the spoke 100. The legs 142, 144 resist act resiliently and have a large bending stiffness allowing the nose portion 130 of the spoke to act as a joint body connecting the radially inner leg 142 with the radially outer leg 144. The feet 112, 114 act as second and third joint bodies, connecting the radially inner leg 142 to the hub and the radially outer leg 144 with the outer band 200.

Reinforcement membrane 600 at the radially inner foot 112 and reinforcement membrane 620 at the radially outer foot 114 reinforces the circumferentially narrow portion, or the "heel" portion of the radially inner foot 112 and radially outer foot 114. During compression of the spoke, the heel portion of the foot exhibits tensile forces. The reinforcement membrane helps reinforce this portion and reduce crack formation and propagation allowing for use of a lower hysteresis "softer" rubber for the elastomeric body of the foot 112, 114. Such "softer" rubbers improve overall performance of the tire by reducing rolling resistance and, if attached to a vehicle, improve energy efficiency. The rubber of the reinforcement membrane may also be chosen so as to provide better adhesion to the outer band and or hub, thereby reducing or eliminating any detachment of the spoke from the outer band and or hub.

Figure 6:
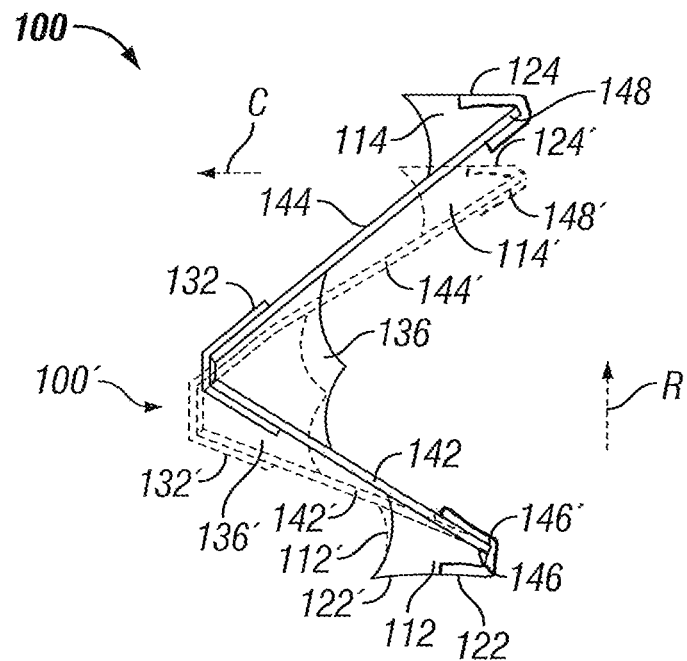
FIG. 6 provides a section view of an embodiment of the present invention forming a part of a tire, the embodiment in an unloaded state (shown in solid lines) and under nominal loading conditions in compression (shown in dashed lines).

FIG. 6 shows a partial lateral section view of the exemplary embodiment of a spoke 100 attached to an outer tread band 200 and hub 12 and forming a part of a tire 10. In the particular embodiment shown, 64 spokes are attached around the inner circumference of the outer tread band 200. Under nominal loading conditions, for the tire of the exemplary embodiment 215/45 R17 sized tire shown here, the tire deflects 20 mm from the unloaded state. In the exemplary embodiment, 500 kg of mass load (approximately 4,900 N force) was used to approximate the nominal loading condition of the tire.

When the spoke 100 is deformed radially inward, undergoing compression between the radially outer foot 114 and radially inner foot 112, the elastomeric joint body 136 of the nose 130 undergoes compression between the radially inner leg 142 and radially outer leg 144 of the spoke. The radially outer elastomeric joint body 114 of the radially outer foot 114 undergoes compression along the portion closest to the nose 130 and undergoes tension on the distal portion of the elastomeric joint body 114.

Similarly at the radially inner foot 112, when the spoke 100 is deformed radially inward, the elastomeric joint body 112 of the radially inner foot 112 undergoes compression along the portion closest to the nose 130 and undergoes tension on the distal portion of the elastomeric joint body 112.

The dashed lines in FIG. 6 show the spoke 100' undergoing compression between the radially outer foot 114' and the radially inner foot 112'. The compressed spoke 100' is shown positioned with the hub mating surface 122, 122' fixed in position while the radially outer foot 114, 114' is displaced radially inward. As such, it may be observed that the radially inner portion 146, 146' of the radially inner leg 142, 142' is constrained by the reinforcement membranes 600, 620 from being displaced radially outward when the spoke is compressed such that the radially inner portion 146' of the radially inner leg 142' is inhibited from moving radially outward relative to the radially inner surface 122' of the radially inner foot 112'. Likewise, a similar displacement is inhibited from occurring at the radially outer foot 114, 114' with the radially outer portion 148, 148' of the radially outer leg 144, 144' is inhibited from being displaced radially inward when the spoke is compressed such that the radially outer portion 148' of the radially outer leg 144' is inhibited from moving radially inward relative to the radially outer surface 124' of the radially outer foot 114'. The construction of the spoke inhibiting displacement of the radially outer portion 148, 148' of the radially outer leg 144, 144' and radially inner portion 146, 146' of the radially inner leg 142, 142' is referred herein as having a "constrained" or "not free" spoke end.

The nose portion 130 of the present embodiment possesses a reinforcement membrane 132 which constrains the radially inner portion of the radially outer spoke 144 and radially outer portion of the radially inner spoke 142, restraining them from displacing away from one another when the spoke is under compression. The elastomeric joint body 136 undergoes compression when the spoke 100 is compressed. It may be observed that the portion of the elastomeric joint body 136 farthest from the reinforcement membrane 132 is contracted radially as the spoke 100 is compressed. The construction of the spoke disallowing displacement of the radially inner portion of the radially outer leg 144 and radially outer portion of the radially inner leg 142 may be referred herein as being "constrained" or "not free."

Figure 7:
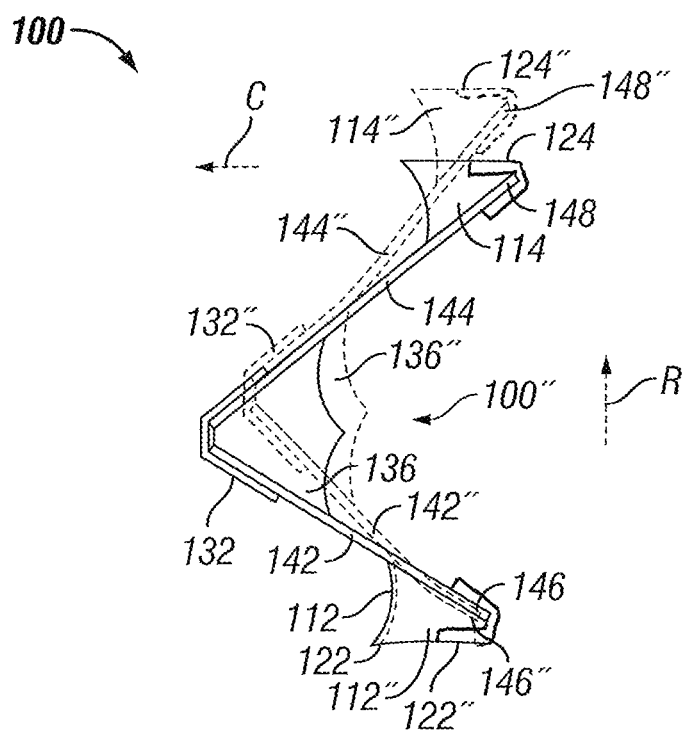
FIG. 7 provides a section view of an embodiment of the present invention forming a part of a tire, the embodiment in an unloaded state (shown in solid lines) and under nominal loading conditions in tension (shown in dashed lines).

FIG. 7 shows the same embodiment when in tension such that the radially outer foot 114, 114" is displaced away from the radially inner foot 112, 112". The spoke 100 shown generally unloaded in solid lines and also the spoke 100' is shown in tension by the dashed lines. Note how the portions of the feet 112, 112", 114, 114" which underwent compression when the spoke was in compression are undergoing tension when the spoke is undergoing tension as shown in the present figure. Likewise the portions of the elastomeric joint bodies of the feet 112, 112", 114, 114" which underwent tension when the spoke was in compression are undergoing compression when the spoke is undergoing tension as shown in the present figure. The elastomeric joint body 136, 136" of the nose portion 130, 130" undergoes tension in the portion closest to the feet 112, 112", 114, 114" of the spoke 100, 100".

The embodiments shown in FIG. 5, FIG. 6 and FIG. 7 each show a protrusion 138 on the circumferentially wider portion of the nose elastomeric joint body 136. In other embodiments, the protrusion may be reduced or eliminated, such as shown in FIG. 3.

Figure 8:
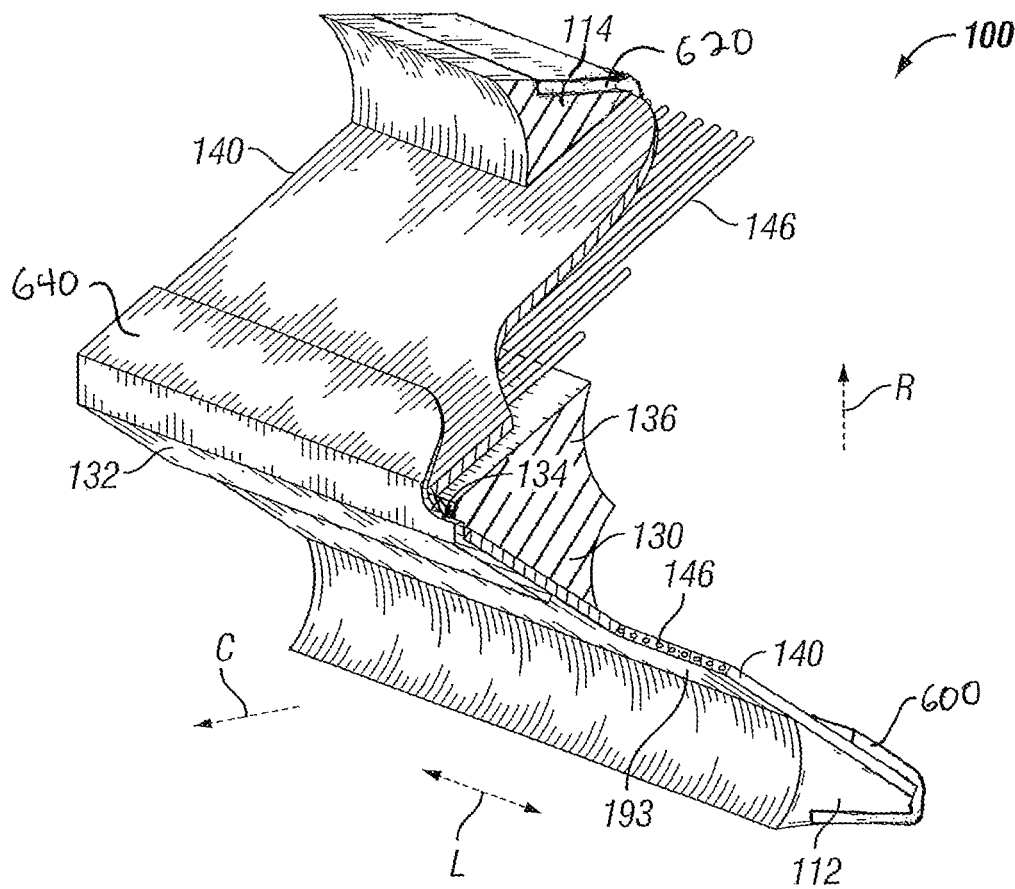
FIG. 8 provides a perspective view of an exemplary embodiment of the spoke of the present invention with portions removed to show the embodiment's components including reinforcement location and orientation.

FIG. 8 shows a perspective cutaway view of the spoke embodiment. Portions of the reinforcement 134 of the nose reinforcement membrane 132 are shown, as well as a portion of the elongated leg reinforcements 146 of the leg 140 and a part of the foot reinforcements of the foot reinforcement membrane are shown as well. The reinforcement cords of the nose membrane are oriented at a +45 degree angle and a −45 degree angle to the surface of the membrane and wrapped around the nose 130 of the spoke 100. The cords of reinforcement membrane in this embodiment are interwoven. In other embodiments, the cords may be laid and not interwoven at different angles, or in yet other embodiments they may have the same angle. In other embodiments, reinforcement membranes may also be laid upon one another, each having similar cord angles or distinct cord angles. The support element 140 reinforcements 146 are shown as elongated reinforcements oriented generally in the radial direction along the length of the support elements 140.

Figure 9:
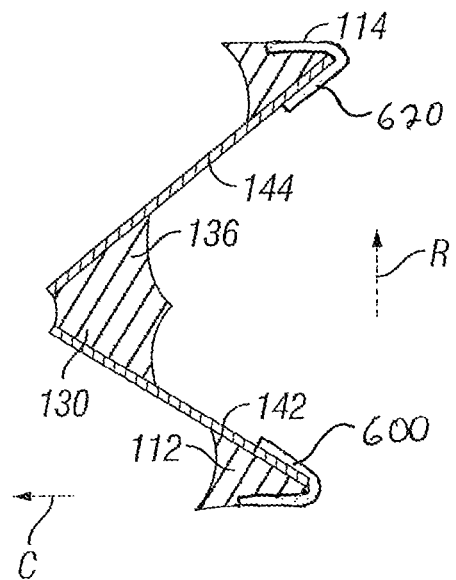
FIG. 9 shows an equatorial section view of another exemplary alternative embodiment of the invention.

FIG. 9 shows a section view of an alternative embodiment wherein the nose reinforcement membrane is present. Here the portion of elastomeric joint body 136 of the nose 130 farthest from the feet 112, 114 is allowed to stretch apart in the radial direction when the spoke is under compression, much like the portion of the elastomeric joint bodies 112, 114 farthest from the nose portion 130 of the spoke 100. Thus in this embodiment, the radially inner end of the radially outer support element 144 is "free." In this particular embodiment the elastomeric joint body 136 of the nose portion 130 is free of any elongated reinforcements.

Figure 10:
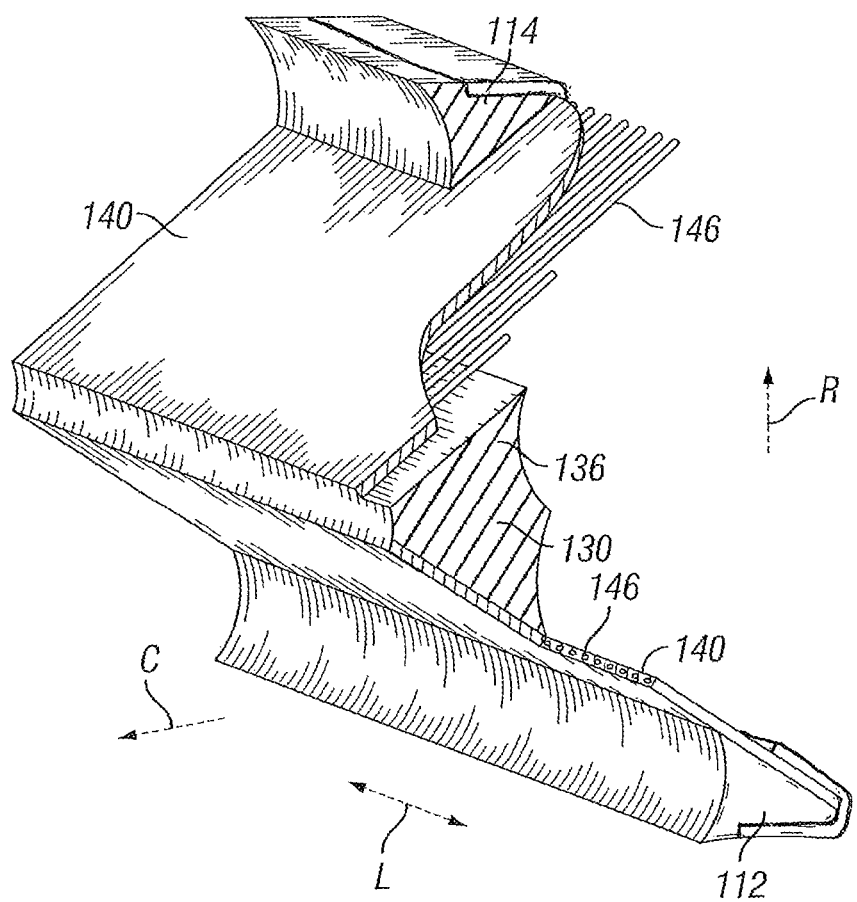
FIG. 10 shows a perspective view of the alternative exemplary embodiment of the spoke of the present invention with portions removed to show the embodiment's components including reinforcement location and orientation.

FIG. 10 shows a perspective cutaway view of the spoke embodiment. Portions of the elongated leg reinforcements 146 of the leg 140 are shown. The support element 140 reinforcements 146 are shown as elongated reinforcements oriented generally in the radial direction along the length of the support elements 140. The reinforcements 146 of the present embodiment are pultruded glass resin composite.

Figure 11:
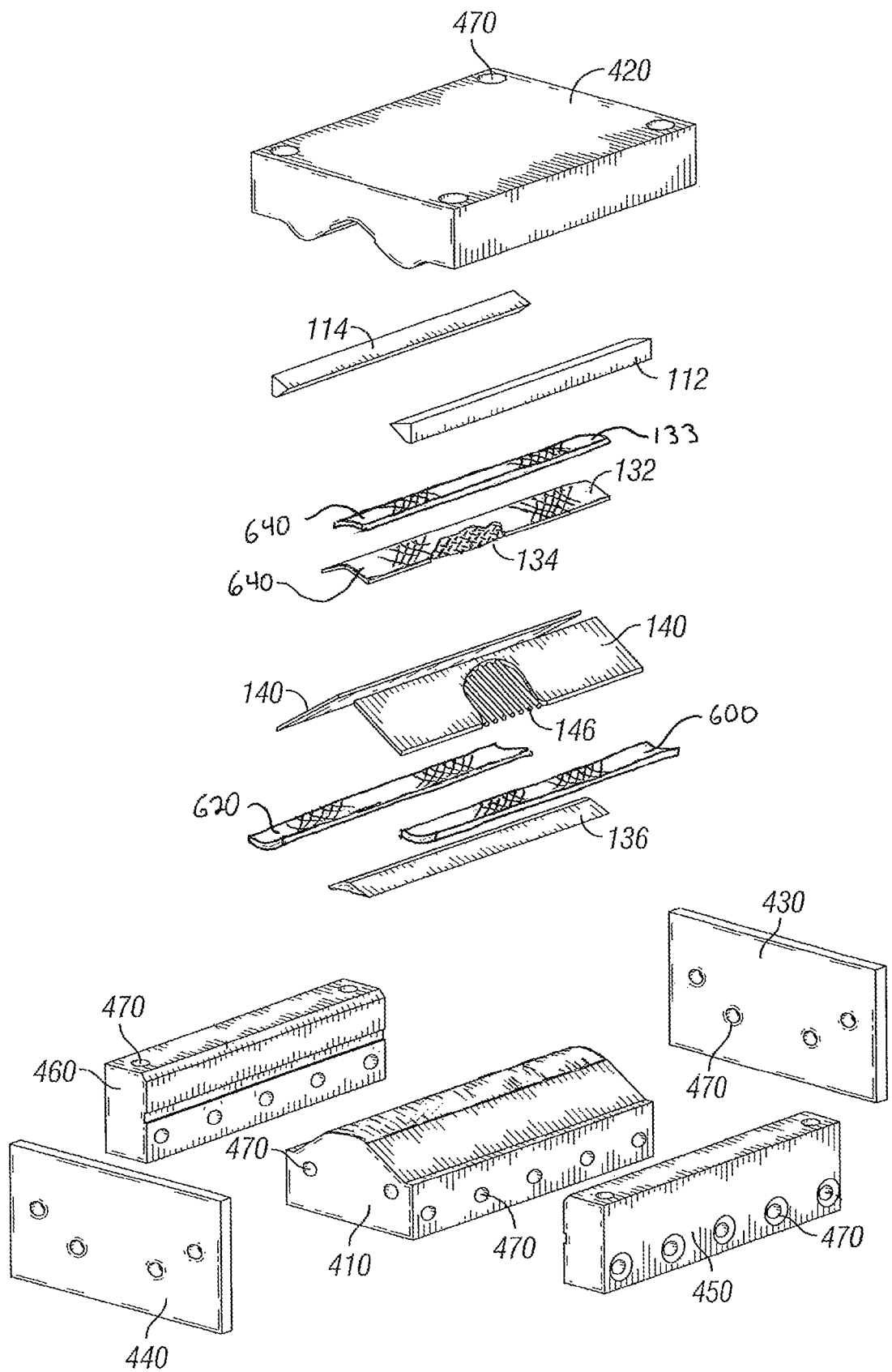
FIG. 11 provides a perspective view of an exemplary embodiment of a mold used for forming a spoke embodiment of the invention. The resilient composite structure's components are shown, with some components having a portion of the elastic material removed to show reinforcement location and orientation.

FIG. 11 shows an exploded perspective view of a mold 400, 410, 420, 430, 440, 450, 460 used to manufacture an individual spoke 100. The spoke components are shown separated as they are placed into the mold. Some of the spoke components show the orientation of the reinforcement fibers and cords. For example, the nose reinforcement membrane 132 cord reinforcements 134 are shown in the partial cutaway view of that component. The reinforcements are shown in this embodiment to run parallel and perpendicular to one another at +45 degrees and −45 degrees to the width of the reinforcement membrane 132. Here, the reinforcement membrane cords 134 are shown to be interwoven. Two nose reinforcement membranes 132, 133 are shown, with the outer reinforcement membrane 133 shown to possess a shorter width. Both of the legs 140, 142, 144 are shown and the radially inner leg 142 is shown with a partial cut-away showing the composite glass resin reinforcements 146 positioned parallel to one another and along the width of the radially inner leg 140. Reinforcement membranes 600, 620 of the radially inner foot 112 and radially outer foot 114 are also shown. While the reinforcements 146 of the legs 140 are resiliently flexible, the fiber reinforcement 134 of the nose reinforcement membrane 132, 133, 640 and radially inner foot reinforcement membrane 600 and radially outer foot reinforcement membrane 620 are flexible enough to be permanently deformed upon molding of the surrounding rubber matrix material.

Once the various uncured components are laid in place over the mold bottom 410, the mold 400 is closed and secured. Here the mold is closed with screw fasteners through apertures 470 and secured to threaded portions of the apertures 470 of the mold components. Tightening of the fasteners exert pressure, or/and additional pressure may be applied to the mold top during curing. Heating of the mold 400 heats the rubber components within and cures the rubber, adheres the rubber components together and forms a composite spoke having excellent resilient qualities of sufficient durability for use as a structural element in an automotive non-pneumatic tire. Other uses for the resilient composite structure may include vibration isolation mounts, such as motor mounts, transmission mounts or seat mounts, or used as a resilient hinge to allow movement of one object relative to another object otherwise connected by the resilient composite structure.

Figure 12:
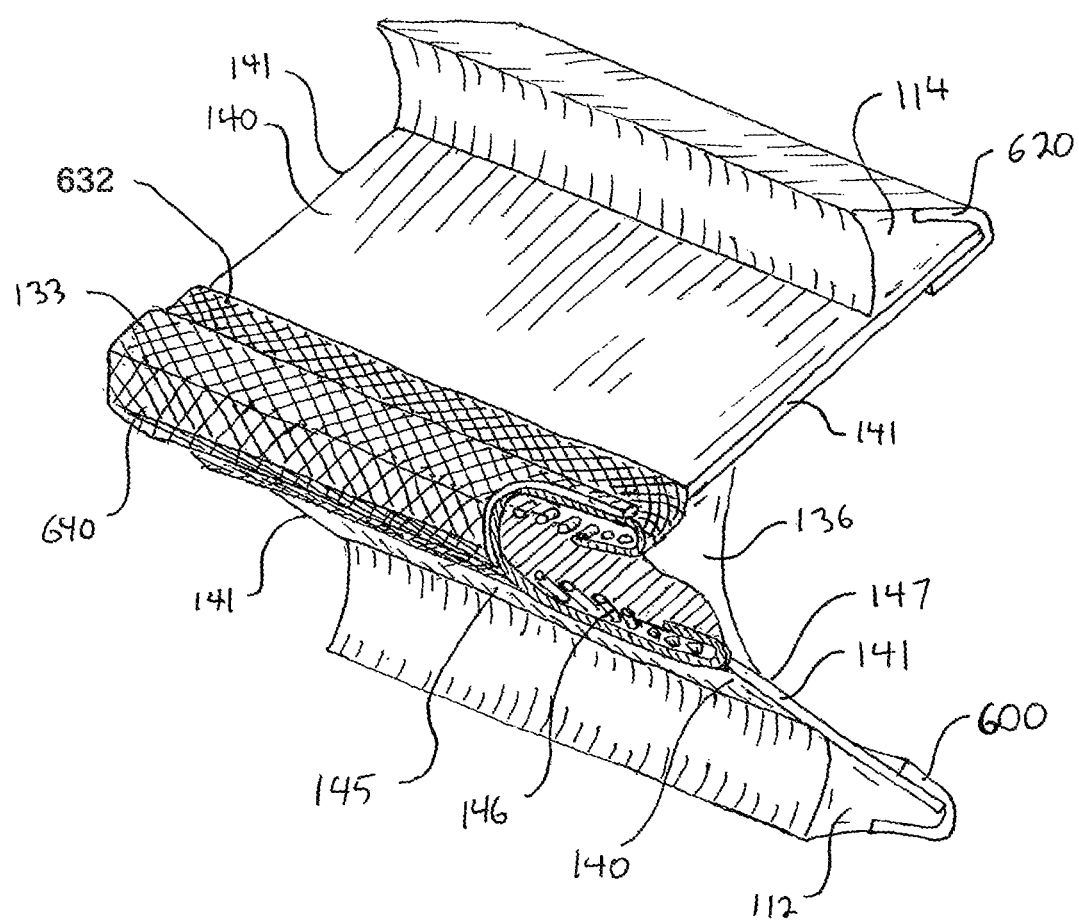
FIG. 12 provides a perspective view of an alternative exemplary embodiment of a spoke for a non-pneumatic tire wherein the nose portion possesses two reinforcement membranes, each comprised of a woven reinforcement cords oriented at a +/−45 degree angle.

FIG. 12 shows a perspective cutaway view of an alternative embodiment where the inner nose reinforcement membrane 632, 640 wraps around the lateral edges 141 of the support elements 140. The reinforcement membrane 632 mostly lies on the first side 145 of the support element and the lateral ends of the reinforcement membrane 632 wrap around the lateral edges 141 of the support elements 140 and lie along the second side 147 of the support element 140. This wrapping of the lateral ends of the reinforcement membrane 640 helps to reinforce the support element 140 and the reinforcements 146 contained therein, particularly those closer to the lateral edges 141.

Figure 13:
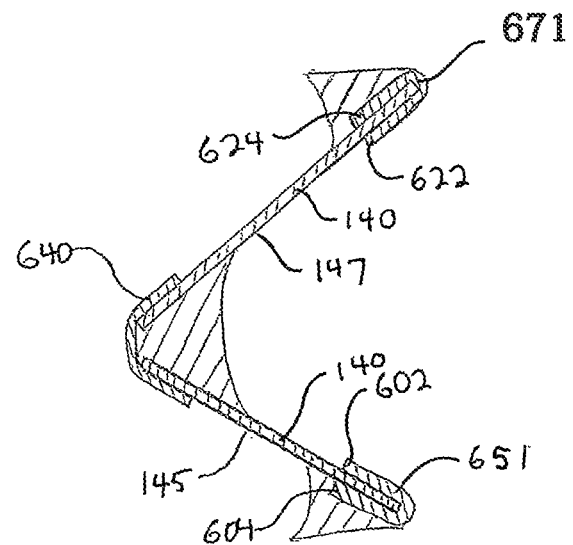
FIG. 13 provides a lateral side elevation view of an exemplary alternative embodiment showing an alternative placement of the reinforcement membrane in the radially inner foot and radially outer foot of the spoke.

FIG. 13 shows an alternative embodiment where the reinforcement membranes 651, 671 located at the radially inner foot 112 and radially outer foot 114 are positioned so that a first end 602, 622 of each reinforcement membrane 651, 671 is positioned along and attached to the second side 147 of the associated support element 140 and a second end 604, 624 of each reinforcement membrane 651, 671 positioned on the same side of the support element 140 as the first side 145 of the support element 140. In this particular embodiment, the second end 604, 624 reinforcement membrane 651, 671 is positioned adjacent to the support element 140, i.e. between the elastomeric body and the support element 140. In alternative embodiments, such as the embodiment shown in FIG. 18, the second end 604, 624 may be positioned between the elastomeric body and a first surface, such as the inner surface of an outer tread band or between the elastomeric body and a second surface, such as the outer surface of a hub.

Figure 14:
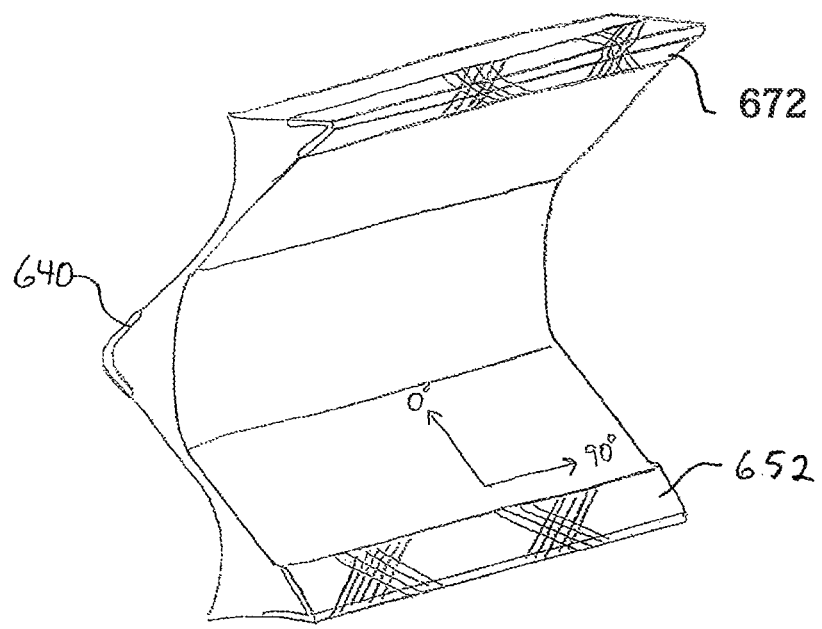
FIG. 14 provides a perspective view of an exemplary embodiment of the spoke where the reinforcement membranes of the radial inner foot and radially outer foot have their cords laid at a +45 degree angle and a −45 degree angle.

FIG. 14 shows an embodiment where the cords of the reinforcement membranes 652, 672 of the radially inner foot 112 and radially outer foot 114 are oriented at approximately a +45 degree angle and approximately a −45 degree angle, the angle being measured where 0 degrees is oriented along the length of the support element in the radial direction and 90 degrees is oriented in the lateral direction of the spoke as shown. The term "approximately" as used herein should be understood to mean+ or −10% of the value prescribed, or where a measurement of an angle is concerned, + or −10 degrees unless otherwise defined herein.

Figure 15:
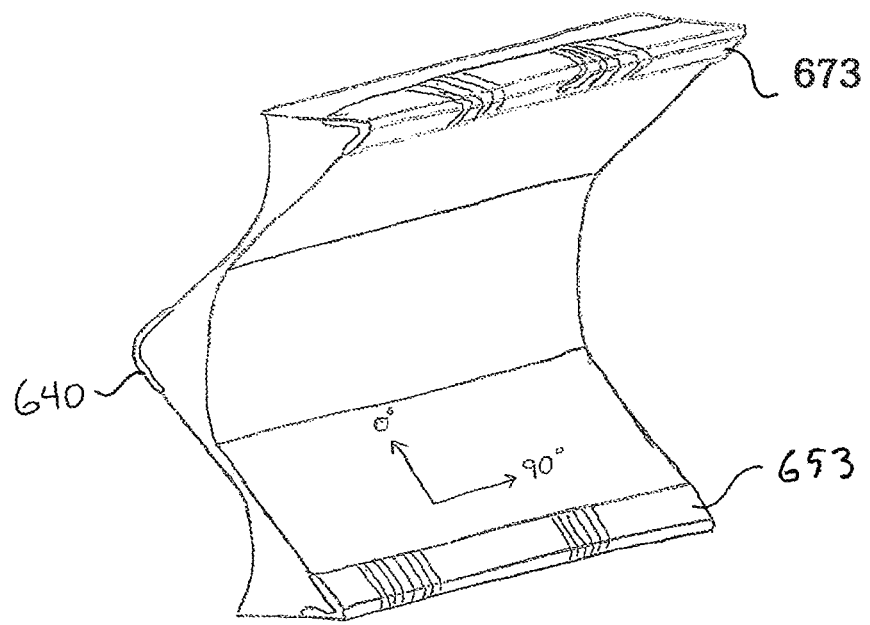
FIG. 15 provides a perspective view of an alternative exemplary embodiment of the spoke.

FIG. 15 shows an alternative embodiment where the cords of the reinforcement membranes 653, 673 of the radially inner foot 112 and radially outer foot 114 are oriented at approximately a +0 degree angle, the angle being measured where 0 degrees is oriented along the length of the support element in the radial direction and 90 degrees is oriented in the lateral direction of the spoke as shown.

Figure 16:
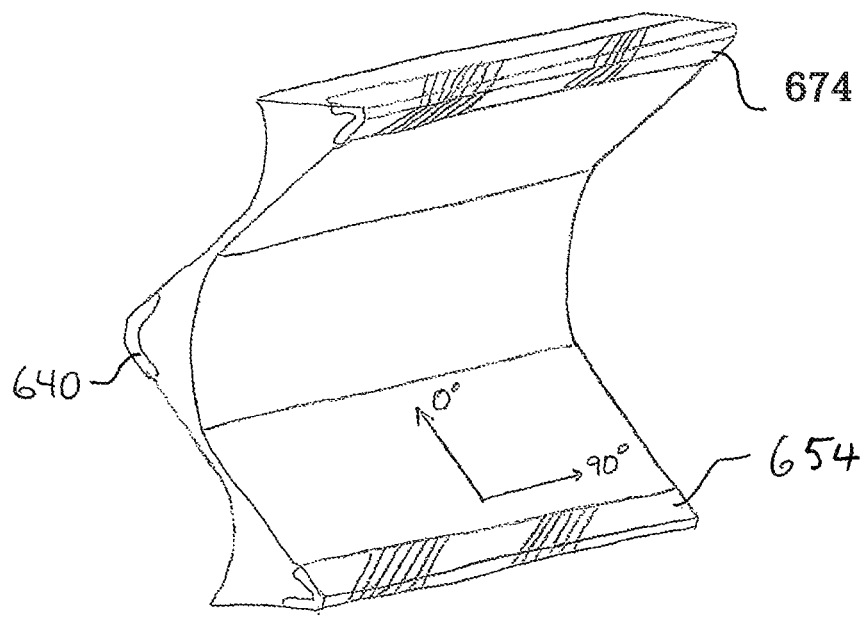
FIG. 16 provides a perspective view of another alternative exemplary embodiment of the spoke.

FIG. 16 shows an alternative embodiment where the cords of the reinforcement membranes 654, 674 of the radially inner foot 112 and radially outer foot 114 are oriented at approximately a +60 degree angle, the angle being measured where 0 degrees is oriented along the length of the support element in the radial direction and 90 degrees is oriented in the lateral direction of the spoke as shown.

Figure 17:
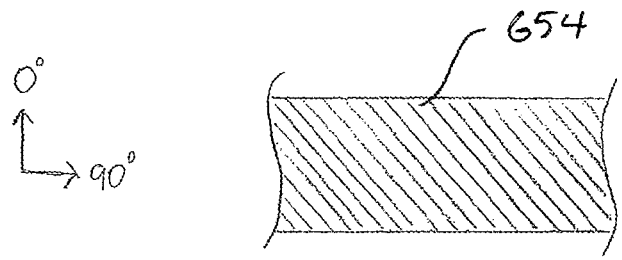
FIG. 17 provides an elevation view of a section of an embodiment of the reinforcement membrane cord orientation.

FIG. 17 shows a partial section view of the reinforcement membrane 654 where the cords are oriented at a −45 degree angle. It should be understood that other angles could be chosen. When the cord is positioned at an angle other than an angle parallel to the elongated reinforcements 140, as shown, each cord overlaps more than one elongated reinforcements 146 of the support element 140. This overlap helps to spread the stress from one elongated reinforcement to the other elongated reinforcements.

Figure 18:
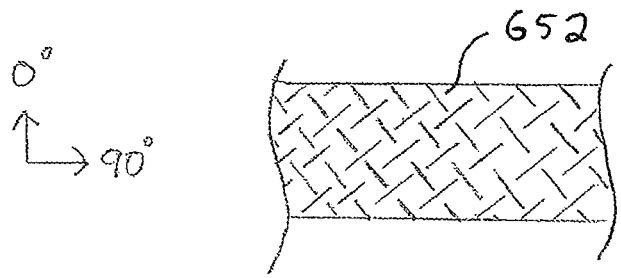
FIG. 18 provides an elevation view of a section of another embodiment of the reinforcement membrane cord orientation.

FIG. 18 shows a partial section view of the reinforcement membrane 652 where the cords are oriented at a −45 degree angle and a +45 degree angle and the cords are interwoven together. It should be understood that other angles could be chosen. It also should be understood that other interweaving patterns could be chosen other than the one shown.

Figure 19:
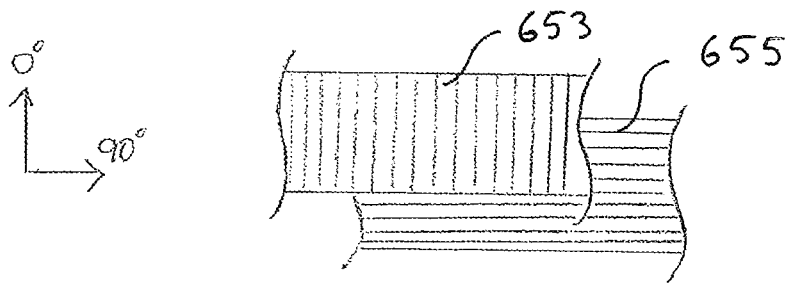
FIG. 19 provides an elevation view of a section of an embodiment of the reinforcement membrane cord orientation where a plurality of membranes are laid on top of one another.

FIG. 19 shows a partial section view of the reinforcement membranes 653, 655 where the cords are oriented at a 90 degree angle and a 0 degree angle and the cords are laid on top of one another and not interwoven.

Figure 20:
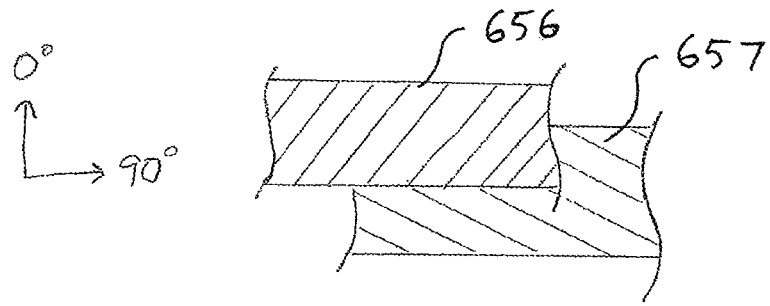
FIG. 20 provides an elevation view of a section of another embodiment of the reinforcement membrane cord orientation where a plurality of membranes are laid on top of one another.

FIG. 20 shows a partial section view of the reinforcement membranes 656, 657 where the cords are oriented at a 30 degree angle and a −65 degree angle and the cords are laid on top of one another and not interwoven such that the cords form an asymmetric pattern. It should be understood that other angles could be chosen.

It also should be understood for any of the reinforcement membranes, multiple layers of cords, other than just two layers, could be chosen, such as three layers, four layers, five layers, etc.

The "v-shape" of the embodiments of the spoke shown and described herein allow the adjacent spokes to "nest" and give linear spring rate when deflected radially over a distance approximately equal to the tires vertical deflection. The nesting of the spokes avoid adjacent spokes from clashing under normal loading conditions.

It should be understood by a person of ordinary skill in the art that the stiffness of the spoke may be adjusted by adjusting the length of the "v" of the "v-shaped spoke", the constituent material moduli and the internal architecture of the spoke.

It should be understood that other web element configurations and geometries may be used within the scope of the invention, including web elements which are interconnected such as where they may form a honeycomb or other pattern. While when the resilient composite structure is configured as a spoke they are configured to extend in a lateral direction across the width of the tire, it should be understood that they may be configured at other angles, such as at an angle to the lateral direction of the tire. For example, the spoke may extend at a diagonal between the circumferential direction and the lateral direction of the tire.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" Also, the dimensions and values disclosed herein are not limited to a specified unit of measurement. For example, dimensions expressed in English units are understood to include equivalent dimensions in metric and other units (e.g., a dimension disclosed as "1 inch" is intended to mean an equivalent dimension of "2.5 cm").

As used herein, the term "method" or "process" refers to one or more steps that may be performed in other ordering than shown without departing from the scope of the presently disclosed invention. As used herein, the term "method" or "process" may include one or more steps performed at least by one electronic or computer-based apparatus. Any sequence of steps is exemplary and is not intended to limit methods described herein to any particular sequence, nor is it intended to preclude adding steps, omitting steps, repeating steps, or performing steps simultaneously. As used herein, the term "method" or "process" may include one or more steps performed at least by one electronic or computer-based apparatus having a processor for executing instructions that carry out the steps.

The terms "a," "an," and the singular forms of words shall be taken to include the plural form of the same words, such that the terms mean that one or more of something is provided. The terms "at least one" and "one or more" are used interchangeably. Ranges that are described as being "between a and b" are inclusive of the values for "a" and "b."

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

What is claimed is:

1. A resilient composite structure for connecting a first surface and a second surface comprising:
   a support element having a first end, a second end, a first side and a second side, wherein said first end of said support element connects to said first surface and said second end of said support element connects to said second surface;
   an elastomeric joint body connecting said first end of said support element to said first surface, said elastomeric joint body positioned on said first side of said support element;
   a reinforcement membrane connected to said first end of said support element, said reinforcement membrane having a first end and a second end, said first end of said reinforcement membrane positioned adjacent to said second side of said support element and said second end of said reinforcement membrane positioned on the same side of the support element as said first side of said support element;
   wherein the support element is comprised of a plurality of elongated reinforcements and a plurality of cords of the reinforcement membrane cross over two or more elongated reinforcements of the plurality of elongated reinforcements.

2. The resilient composite structure of claim 1 wherein said first surface is an inner surface of an outer tread band and said second surface is an outer surface of a hub; the hub, the resilient composite structure and the outer tread band forming a wheel.

3. The resilient composite structure of claim 2 wherein said resilient composite structure forms a spoke extending from a first lateral side of the wheel to a second lateral side of the wheel.

4. The resilient composite structure of claim 1 wherein the reinforcement membrane is comprised of cords.

5. The resilient composite structure of claim 1 wherein the cords of the reinforcement membrane are interwoven.

6. The resilient composite structure of claim 5 wherein a first plurality of said plurality of elongated reinforcements and a second plurality of said plurality of elongated reinforcements are comprised of fiberglass.

7. The resilient composite structure of claim 1 wherein the second end of the reinforcement membrane is positioned between the elastomeric joint body and the support element.

8. The resilient composite structure of claim 1 wherein the second end of the reinforcement membrane is positioned between the elastomeric joint body and the first surface.

9. The resilient composite structure of claim 1 wherein said support element is further comprised of:
   a first segment and a second segment, said first segment positioned adjacent to said first surface and said second segment positioned to said second surface, said first segment possessing said first end, said second segment possessing said second end, both segments possessing said first side, and both segments possessing said second side;
   the first segment possessing a first terminal end, a second terminal end, the first side and the second side, wherein said first terminal end of said first segment connects to said first surface, wherein said first terminal end is the same as the first end of the support element;
   the second segment possessing a first terminal end, a second terminal end, the first side and the second side, wherein said second terminal end of said second segment connects to said second surface and said first terminal end of said second segment connects to said second terminal end of said first segment, wherein said second terminal end is the same as the second end of the support element;
   a second elastomeric joint body connecting said second end of said support element to said second surface, said elastomeric joint body positioned on said first side of said support element;
   a third elastomeric joint body connecting said second terminal end of said first segment to said first terminal end of said second segment, said third elastomeric membrane positioned on said second side of said support element;
   a second reinforcement membrane connected to said second end of said support element, said second reinforcement membrane having a first end and a second end, said first end of said second reinforcement membrane positioned adjacent to said second side of said support element and said second end of said second reinforcement membrane positioned on the same side of said support element as said first side of said support element.

10. The composite reinforcement structure of claim 9 wherein said support element is further comprised of:
a third reinforcement membrane connected to said second end of said support element, said third reinforcement membrane having a first end and a second end, said first end of said third reinforcement membrane positioned adjacent to said first side of said support element and said second end of said third reinforcement membrane positioned adjacent to said first side of said support element, said third reinforcement membrane connecting said first segment to said second segment.

11. The resilient composite structure of claim 9 wherein said first segment of said support element is comprised of a first plurality of elongated reinforcements and said second segment of said support element is comprised of a second plurality of elongated reinforcements, wherein said third elastomeric joint body is positioned between and along the first plurality of elongated reinforcements and the second plurality of elongated reinforcements.

12. The resilient composite structure of claim 11 wherein said first plurality of elongated reinforcements and said second plurality of elongated reinforcements are comprised of fiberglass.

13. The resilient composite structure of claim 9 wherein said resilient composite structure is comprised of rubber.

14. The composite reinforcement structure of claim 9 wherein said support element is further comprised of:
a third reinforcement membrane connected to said second end of said support element, said third reinforcement membrane having a first end and a second end, said first end of said third reinforcement membrane positioned adjacent to said first side of said support element and said second end of said third reinforcement membrane positioned adjacent to said first side of said support element, said third reinforcement membrane connecting said first segment to said second segment.

15. The resilient composite structure of claim 9 wherein said first segment of said support element is comprised of a first plurality of elongated reinforcements and said second segment of said support element is comprised of a second plurality of elongated reinforcements, wherein said third elastomeric joint body is positioned between and along the first plurality of elongated reinforcements and the second plurality of elongated reinforcements.

16. The resilient composite structure of claim 1 wherein said resilient composite structure is comprised of rubber.

17. The resilient composite structure of claim 5 wherein a first plurality of said plurality of elongated reinforcements and a second plurality of said plurality of elongated reinforcements are comprised of fiberglass.

18. The resilient composite structure of claim 1 wherein a first plurality of said plurality of elongated reinforcements and a second plurality of said plurality of elongated reinforcements are comprised of fiberglass.

19. A resilient composite structure for connecting a first surface and a second surface comprising:
a support element having a first end, a second end, a first side and a second side, wherein said first end of said support element connects to said first surface and said second end of said support element connects to said second surface;
an elastomeric joint body connecting said first end of said support element to said first surface, said elastomeric joint body positioned on said first side of said support element;
a reinforcement membrane connected to said first end of said support element, said reinforcement membrane having a first end and a second end, said first end of said reinforcement membrane positioned adjacent to said second side of said support element and said second end of said reinforcement membrane positioned the same side of said support element as said first side of said support element;
a first segment and a second segment, said first segment positioned adjacent to said first surface and said second segment positioned to said second surface, said first segment possessing said first end, said second segment possessing said second end, both segments possessing said first side, and both segments possessing said second side;
the first segment possessing a first terminal end, a second terminal end, the first side and the second side, wherein said first terminal end of said first segment connects to said first surface, wherein said first terminal end is the same as the first end of the support element;
the second segment possessing a first terminal end, a second terminal end, the first side and the second side, wherein said second terminal end of said second segment connects to said second surface and said first terminal end of said second segment connects to said second terminal end of said first segment, wherein said second terminal end is the same as the second end of the support element;
a second elastomeric joint body connecting said second end of said support element to said second surface, said elastomeric joint body positioned on said first side of said support element;
a third elastomeric joint body connecting said second terminal end of said first segment to said first terminal end of said second segment, said third elastomeric membrane positioned on said second side of said support element;
a second reinforcement membrane connected to said second end of said support element, said second reinforcement membrane having a first end and a second end, said first end of said second reinforcement membrane positioned adjacent to said second side of said support element and said second end of said second reinforcement membrane positioned on the same side of said support element as said first side of said support element;
a third reinforcement membrane connected to said second end of said first segment, said third reinforcement membrane having a first end and a second end, said first end of said third reinforcement membrane positioned adjacent to said first side of said support element and said second end of said third reinforcement membrane positioned adjacent to said first side of said support element, said third reinforcement membrane connecting said first segment to said second segment;
wherein said first segment of said support element is comprised of a first plurality of elongated reinforcements and said second segment of said support element is comprised of a second plurality of elongated reinforcements, wherein said third elastomeric joint body is positioned between and along the first plurality of elongated reinforcements and the second plurality of elongated reinforcements;
wherein said reinforcement membranes are comprised of cords embedded in rubber;
wherein said first plurality of elongated reinforcements and said second plurality of elongated reinforcements are comprised of fiberglass embedded in rubber;
wherein said elastomeric joint bodies are comprised of rubber.

20. A resilient composite structure for connecting a first surface and a second surface comprising:
- a support element having a first end, a second end, a first side and a second side, wherein said first end of said support element connects to said first surface and said second end of said support element connects to said second surface;
- an elastomeric joint body connecting said first end of said support element to said first surface, said elastomeric joint body positioned on said first side of said support element;
- a reinforcement membrane connected to said first end of said support element, said reinforcement membrane having a first end and a second end, said first end of said reinforcement membrane positioned adjacent to said second side of said support element and said second end of said reinforcement membrane positioned on the same side of the support element as said first side of said support element;
- wherein said support element is further comprised of:
- a first segment and a second segment, said first segment positioned adjacent to said first surface and said second segment positioned to said second surface, said first segment possessing said first end, said second segment possessing said second end, both segments possessing said first side, and both segments possessing said second side;
- the first segment possessing a first terminal end, a second terminal end, the first side and the second side, wherein said first terminal end of said first segment connects to said first surface, wherein said first terminal end is the same as the first end of the support element;
- the second segment possessing a first terminal end, a second terminal end, the first side and the second side, wherein said second terminal end of said second segment connects to said second surface and said first terminal end of said second segment connects to said second terminal end of said first segment, wherein said second terminal end is the same as the second end of the support element;
- a second elastomeric joint body connecting said second end of said support element to said second surface, said elastomeric joint body positioned on said first side of said support element;
- a third elastomeric joint body connecting said second terminal end of said first segment to said first terminal end of said second segment, said third elastomeric membrane positioned on said second side of said support element;
- a second reinforcement membrane connected to said second end of said support element, said second reinforcement membrane having a first end and a second end, said first end of said second reinforcement membrane positioned adjacent to said second side of said support element and said second end of said second reinforcement membrane positioned on the same side of said support element as said first side of said support element.

* * * * *